J. BAKER & A. MATTFELDT.
Car-Couplings.

No. 151,194.  Patented May 26, 1874.

Witnesses  
R. N. Dyer  
C. Thurman

Inventors  
John Baker  
Adolph Mattfeldt  
by Geo. W. Dyer  
Attys.

UNITED STATES PATENT OFFICE.

JOHN BAKER AND ADOLPH MATTFELDT, OF SPRINGFIELD, ILLINOIS.

IMPROVEMENT IN CAR-COUPLINGS.

Specification forming part of Letters Patent No. 151,194, dated May 26, 1874; application filed April 6, 1874.

*To all whom it may concern:*

Be it known that we, JOHN BAKER and ADOLPH MATTFELDT, both of Springfield, in the county of Sangamon and State of Illinois, have invented a new and useful Improvement in Car-Couplers; and we do hereby declare that the following is a full and exact description of the same, reference being had to the accompanying drawings and to the letters of reference marked thereon.

The object we have in view is an improvement on car-couplings, whereby the same may be made less dangerous in use, and more effective in result, without increasing the expense; and our invention therein consists in the combination of a catch for holding the link and a trip-lever for adjusting the vertical position of the outer end of the link, all as more fully hereinafter explained.

In order to enable others skilled in the art to make and use our invention, we proceed to describe the same in connection with the drawings, in which—

Figure 1:
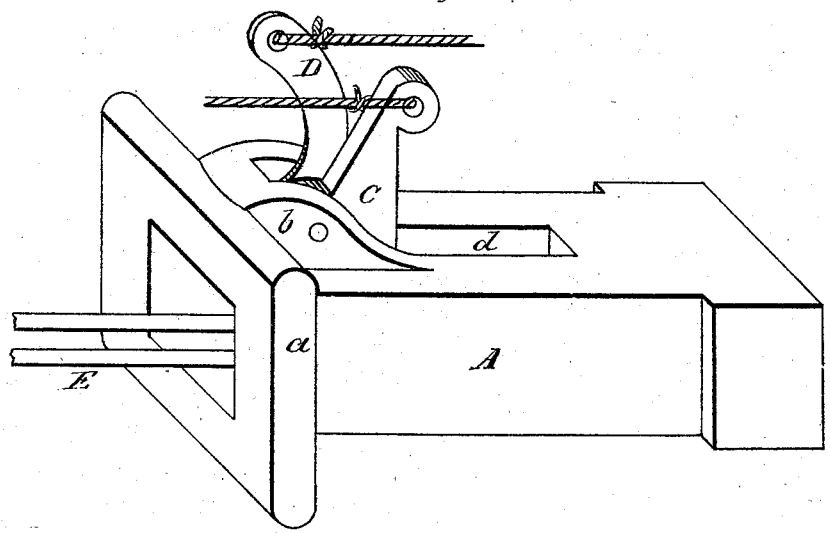
Figure 2:
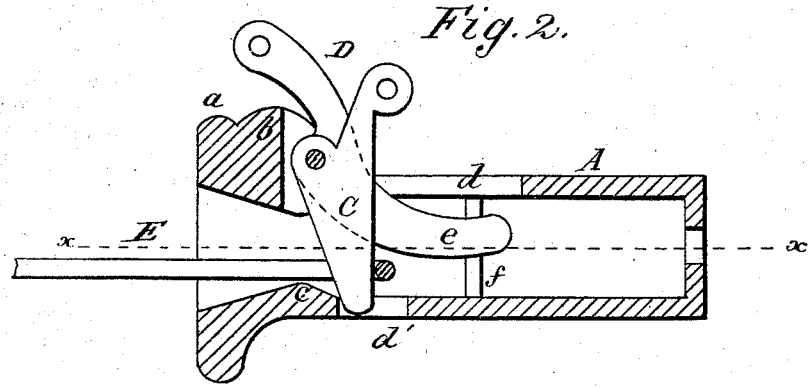
Figure 3:
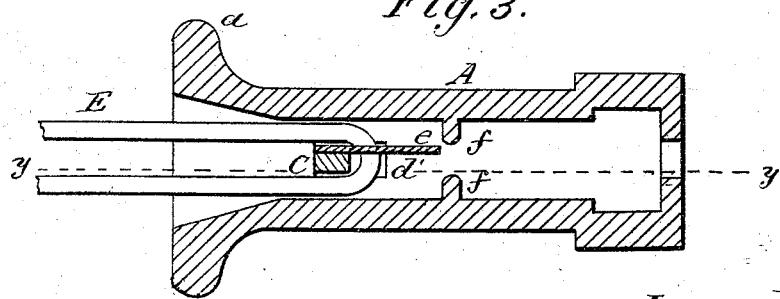

Figure 1 is a perspective view. Fig. 2 is a vertical central longitudinal section on line $y$ $y$, Fig. 3. Fig. 3 is a longitudinal section on line $x$ $x$, Fig. 2.

Similar letters denote like parts in each figure.

A represents a draw-head of ordinary construction outwardly, having a head, $a$, and immediately behind the same a lug, $b$, upon its upper surface. Just behind the mouth of the draw-head the interior is cut away, leaving a shoulder, $c$, beyond which the cavity extends to the rear upon the plane of that portion cut away. The draw-head has also upon its upper side a longitudinal slot, $d$, extending partly through the lug $b$, and on its lower side a corresponding slot, $d'$, of less length than the one just named. A triangular catch, C, is pivoted within the lug, with its front sloped off, so as to present a regular incline to the rear, while its rear side, when in use in position for holding the link, will be vertical. This catch is so weighted that its normal position is vertical, with its front lower edge resting in the slot $d'$. A trip-lever, D, is pivoted also in the lug $b$ by the side of the catch C, and has an arm, $e$, extending nearly at right angles to the rear. Both the catch and trip-lever have provisions for fastening cords, chains, or rods to their upper extremities.

Now, therefore, if an ordinary link, E, be introduced into the draw-head, it will be stopped when sufficiently entered by the shoulders $f$ on the interior of the draw-head, and will be caught and held by the catch C. In this position the outer end of an ordinary link, E, balanced on the shoulder $c$, will be below the level of the draw-head on account of its weight, the greater portion of the link being outside the draw-head. It may be raised to any desired height, depending on the height of the car to be attached, by means of the arm upon the trip-lever D, manipulated by cords, chains, or rods from the platform of the car, which arm, pressing upon the inner end of the link, raises its outer end to any desired elevation. The catch C may be raised by means of cords, chains, or rods worked from the platform of the car, thus allowing the link to be withdrawn when desirable.

Having thus described our car-coupling, what we claim as new therein, and our invention, is—

In combination with the draw-head A, having a shoulder, $c$, and catch C, the trip-lever D, for the purpose of adjusting the horizontal position of the link E, as set forth.

This specification signed and witnessed this 24th day of March, 1874.

JOHN BAKER.
    ADOLPH MATTFELDT.

Witnesses:
  SAML. D. SCHOLES,
  T. C. MATHER.